(12) United States Patent
Yasuda et al.

(10) Patent No.: US 12,071,172 B2
(45) Date of Patent: Aug. 27, 2024

(54) METHOD FOR VISUALIZING A STEERING ANGLE AND LATERAL BOUNDARIES FOR DRIVER ASSIST AND SAFER DRIVING

(71) Applicant: TOYOTA RESEARCH INSTITUTE, INC., Los Altos, CA (US)

(72) Inventors: Hiroshi Yasuda, San Francisco, CA (US); Manuel Ludwig Kuehner, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 239 days.

(21) Appl. No.: 17/320,017

(22) Filed: May 13, 2021

(65) Prior Publication Data

US 2022/0363314 A1    Nov. 17, 2022

(51) Int. Cl.
| | |
|---|---|
| *B62D 15/02* | (2006.01) |
| *B60W 30/08* | (2012.01) |
| *B60W 50/14* | (2020.01) |
| *B60W 50/16* | (2020.01) |
| *B62D 6/00* | (2006.01) |

(52) U.S. Cl.
CPC ......... *B62D 15/0245* (2013.01); *B60W 30/08* (2013.01); *B60W 50/16* (2013.01); *B62D 6/002* (2013.01); *B62D 6/008* (2013.01); *B62D 15/025* (2013.01); *B62D 15/029* (2013.01); *B60W 2050/146* (2013.01); *B60W 2510/202* (2013.01)

(58) Field of Classification Search
None
See application file for complete search history.

(56) References Cited

U.S. PATENT DOCUMENTS

| | | |
|---|---|---|
| 6,226,592 B1 | 5/2001 | Luckscheiter et al. |
| 9,150,246 B2 | 10/2015 | Lee et al. |
| 2007/0091173 A1* | 4/2007 | Kade .................. G01S 5/16 348/119 |
| 2008/0117033 A1 | 5/2008 | Kataoka et al. |
| 2009/0014227 A1 | 1/2009 | Bolourchi |
| 2009/0093930 A1 | 4/2009 | Hatano |
| 2014/0092250 A1 | 4/2014 | Nagasawa et al. |

(Continued)

FOREIGN PATENT DOCUMENTS

| | | | |
|---|---|---|---|
| CN | 111591305 A | 8/2020 | |
| DE | 102014005380 A1 * | 9/2014 | ......... B62D 15/0275 |

(Continued)

OTHER PUBLICATIONS

Elmer, Stephen, "Toyota patents a new smart head-up display", https://www.autoguide.com/auto-news/2016/03/toyota-patents-a-new-smart-head-up-display.html, Mar. 28, 2016.

(Continued)

*Primary Examiner* — Fadey S. Jabr
*Assistant Examiner* — Mario C Gonzalez
(74) *Attorney, Agent, or Firm* — SEYFARTH SHAW LLP

(57) ABSTRACT

A method for a vehicle safety is described. The method includes determining a current steering angle at which a vehicle is traveling. The method also includes displaying the current steering angle relative to a steering angle scale. The method further includes guiding an operator of the vehicle through feedback provided through a steering wheel of the vehicle while displaying the current steering angle relative to the steering angle scale.

15 Claims, 7 Drawing Sheets

(56) References Cited

U.S. PATENT DOCUMENTS

| | | | |
|---|---|---|---|
| 2015/0025743 A1 | 1/2015 | tamura | |
| 2016/0339959 A1 | 11/2016 | Lee | |
| 2017/0144688 A1* | 5/2017 | Pitzer | B62D 15/02 |
| 2017/0274931 A1* | 9/2017 | Yang | B60K 35/00 |
| 2018/0085664 A1 | 3/2018 | Champagne et al. | |
| 2019/0299982 A1* | 10/2019 | Guechai | B60W 30/09 |
| 2019/0369939 A1 | 12/2019 | Levesque et al. | |
| 2020/0074190 A1 | 3/2020 | Khakharia et al. | |
| 2024/0083493 A1* | 3/2024 | Kimura | B62D 5/006 |

FOREIGN PATENT DOCUMENTS

| | | | |
|---|---|---|---|
| DE | 102015219382 A1 | 4/2017 | |
| EP | 0680132 A1 | 11/1995 | |
| EP | 2377745 A1 | 10/2011 | |
| EP | 3236447 A1 | 10/2017 | |
| FR | 2879137 A1 | 6/2006 | |
| JP | 2010204795 A | 9/2010 | |
| JP | 2017052428 A | 3/2017 | |
| JP | 6801508 A | 4/2017 | |
| JP | 2017065281 A | 4/2017 | |
| JP | 6277756 B2 * | 2/2018 | |

OTHER PUBLICATIONS

Salvucci, et al., "A Two-Point Visual Control Model of Steering", Perception, Oct. 2004.

Pohl, et al., "A driver-distraction-based lane-keeping assistance system", Proceeding of the Institution of Mechanical Engineers, Part I; Journal o Systems and Control Engineering, 2007.

He, et al., "Aggregated sparse attention for steering angle prediction", 24th International Conference on Pattern Recognition, Mar. 15, 2018.

* cited by examiner

700

702 DETERMINE A CURRENT STEERING ANGLE AT WHICH A VEHICLE IS TRAVELING

704 DISPLAY THE CURRENT STEERING ANGLE RELATIVE TO A STEERING ANGLE SCALE

706 GUIDE AN OPERATOR OF THE VEHICLE THROUGH FEEDBACK PROVIDED THROUGH A STEERING WHEEL OF THE VEHICLE WHILE DISPLAYING THE CURRENT STEERING ANGLE RELATIVE TO THE STEERING ANGLE SCALE.

*FIG. 7*

METHOD FOR VISUALIZING A STEERING ANGLE AND LATERAL BOUNDARIES FOR DRIVER ASSIST AND SAFER DRIVING

BACKGROUND

Field

Certain aspects of the present disclosure generally relate to autonomous vehicle technology and, more particularly, to visualizing a steering angle and/or lateral boundaries to provide driver assistance for safer driving.

Background

Autonomous agents (e.g., vehicles, robots, etc.) rely on machine vision for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number.

These different levels of autonomous vehicles may provide a safety system that improves driving of a vehicle. For example, in a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle. The set of ADAS features installed in the autonomous vehicle may be a lane keeping assistance system and/or a lane departure warning system.

Conventional lane keeping assistance systems do not provide visual and haptic information to the operator of a gap left inside a safety boundary. Furthermore, conventional lane departure warning systems do not provide visual and haptic information to the operator of a steering angle to stay centered in a lane.

SUMMARY

A method for a vehicle safety is described. The method includes determining a current steering angle at which a vehicle is traveling. The method also includes displaying the current steering angle relative to a steering angle scale. The method further includes guiding an operator of the vehicle through feedback provided through a steering wheel of the vehicle while displaying the current steering angle relative to the steering angle scale.

A non-transitory computer-readable medium having program code recorded thereon for vehicle safety is described. The program code is executed by a processor. The non-transitory computer-readable medium includes program code to determine a current steering angle at which a vehicle is traveling. The non-transitory computer-readable medium also includes program code to display the current steering angle relative to a steering angle scale. The non-transitory computer-readable medium further includes program code to guide an operator of the vehicle through feedback provided through a steering wheel of the vehicle while displaying the current steering angle relative to the steering angle scale.

A system for vehicle safety is described. The system includes a steering angle detection module to determine a current steering angle at which a vehicle is traveling. The system also includes a vehicle display to display the current steering angle relative to a steering angle scale. The system further includes a steering angle correction module to guide an operator of the vehicle through feedback provided through a steering wheel of the vehicle while displaying the current steering angle relative to the steering angle scale.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 is a flowchart illustrating a method of visualizing a current steering angle and providing feedback to safely guide a vehicle operator on a roadway, according to aspects of the present disclosure.

DETAILED DESCRIPTION

Figure 1:
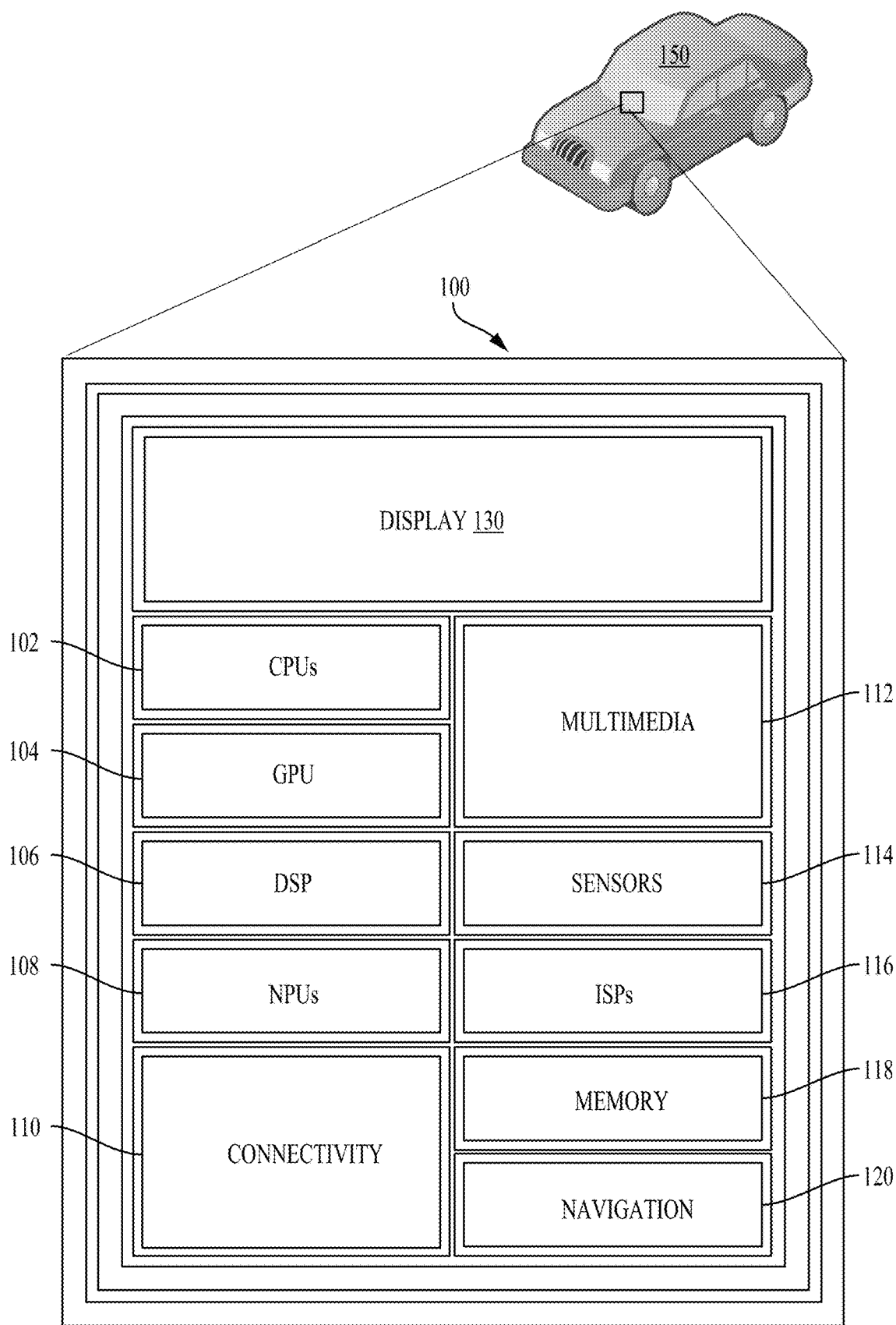
FIG. 1 illustrates an example implementation of designing a neural network using a system-on-a-chip (SOC) for a vehicle safety system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem to solve. In particular, vehicles may swerve in their lanes and temporarily enter adjacent lanes, which may generate traffic oscillations and extra congestion. Highways are potentially congested due to distracted drivers and unexpected braking maneuvers of surrounding vehicles. Advanced driver assistance systems (ADAS) for vehicles are expected to reduce traffic accidents and improve traffic efficiency. In addition, automation of vehicle control on highways is rapidly advancing, which may eventually reduce traffic accidents and improve traffic efficiency.

Reducing traffic congestion may be achieved by effectively warning distracted drivers of vehicles traveling on highways. For example, a set of ADAS features installed in a non-autonomous vehicle may include a lane keeping assistance system and/or a lane departure warning system. Conventional lane keeping assistance systems do not provide visual and haptic information to the operator of a gap left inside a safety boundary. Furthermore, conventional lane departure warning systems do not provide visual and haptic information to the operator of a steering angle to stay centered in a lane.

Aspects of the present disclosure are directed to a vehicle safety system that displays a disparity of a recommended steering angle and a current steering angle for staying in a roadway lane. In some aspects of the present disclosure, the vehicle safety system may apply torque, vibration, and/or haptic feedback to the steering wheel for the operator. In response to the torque, vibration, and/or haptic feedback, a driver corrects the current steering angle relative to the recommended steering angle. In these aspects of the present disclosure, the vehicle safety system displays an amount of correction recommended for safer driving by maintaining a vehicle at a recommended steering angle.

Aspects of the present disclosure are also directed to a vehicle safety system that improves driving by keeping a vehicle between certain boundaries of a roadway lane using visualization. In some aspects of the present disclosure, the vehicle safety system displays safety boundaries, ranges, and/or zones of recommended steering angles. The vehicle safety system also displays the current steering angle. In these aspects of the present disclosure, the vehicle safety system may use varying amounts of haptic feedback laterally on the left and right to guide the operator. These varying amounts of haptic feedback laterally (e.g., to the left or right) help keep the vehicle away from the boundaries. For example, the vehicle safety system may use safety boundaries as the ranges where varying repelling forces apply to guide an operator in a lane for safer driving by remaining in a roadway lane.

FIG. 1 illustrates an example implementation of the aforementioned system and method for a vehicle safety system using a system-on-a-chip (SOC) 100 of a vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to determine one or more merge gaps between vehicles in a target lane of a multilane highway based on images processed by the sensor processor 114. The instructions loaded into a processor (e.g., CPU 102) may also include program code to compute an exposure time in which the ego vehicle is specified to merge into the one or merge gaps, and program code to select a merge gap between a first vehicle and a second vehicle in the target lane of the multilane highway having a maximum exposure time.

Figure 2:
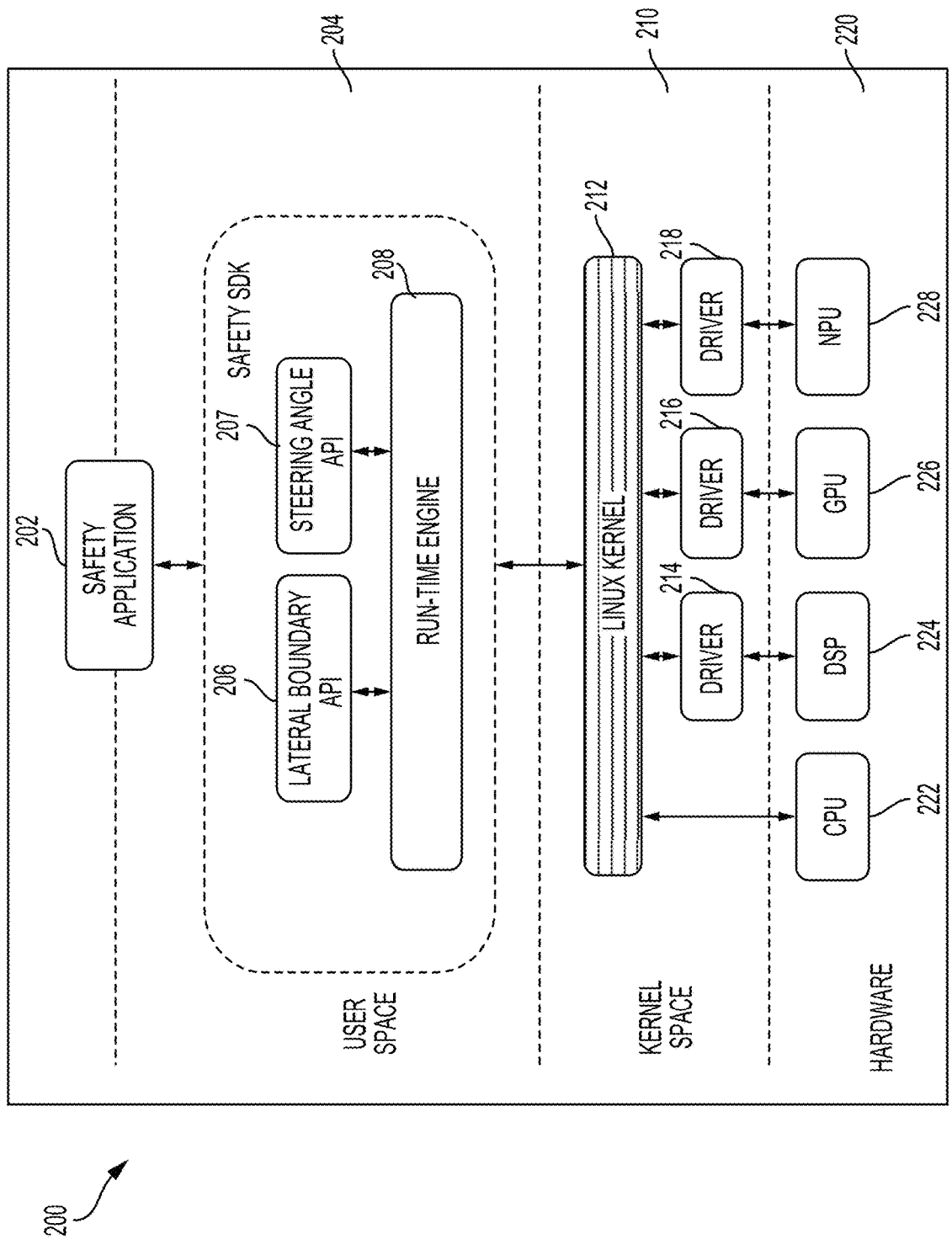
FIG. 2 is a block diagram illustrating a software architecture that may modularize artificial intelligence (AI) functions for a vehicle safety system of an autonomous agent, according to aspects of the present disclosure.

FIG. 2 is a block diagram illustrating a software architecture 200 that may modularize artificial intelligence (AI) functions for vehicle safety, according to aspects of the present disclosure. Using the architecture, a safety application 202 may be designed such that it may cause various processing blocks of a system-on-a-chip (SOC) 220 (for example a CPU 222, a DSP 224, a GPU 226, and/or an NPU 228) to perform supporting computations during run-time operation of the safety application 202. While FIG. 2 describes the software architecture 200 for operating a vehicle safety system, it should be recognized that vehicle safety system functionality is not limited to autonomous agents. According to aspects of the present disclosure, a vehicle safety system is applicable to any vehicle type, provided the vehicle is equipped with appropriate functions of an advanced driver assistance system (ADAS).

The safety application 202 may be configured to call functions defined in a user space 204 that may, for example, provide for vehicle safety services. The safety application 202 may make a request to compile program code associated with a library defined in a lateral boundary application programming interface (API) 206 to help maintain a vehicle between lane boundaries using visualization. The safety application 202 may also make a request to compile program code associated with a library defined in a steering angle API 207 to help maintain a vehicle on a recommended steering angle.

A run-time engine 208, which may be compiled code of a runtime framework, may be further accessible to the safety application 202. The safety application 202 may cause the run-time engine 208, for example, to take actions for communicating with a vehicle driver. When the vehicle begins to wander within a traffic lane, the run-time engine 208 may in turn send a signal to an operating system 210, such as a Linux Kernel 212, running on the SOC 220. FIG. 2 illustrates the Linux Kernel 212 as software architecture for implementing safety features of the vehicle. It should be recognized, however, aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
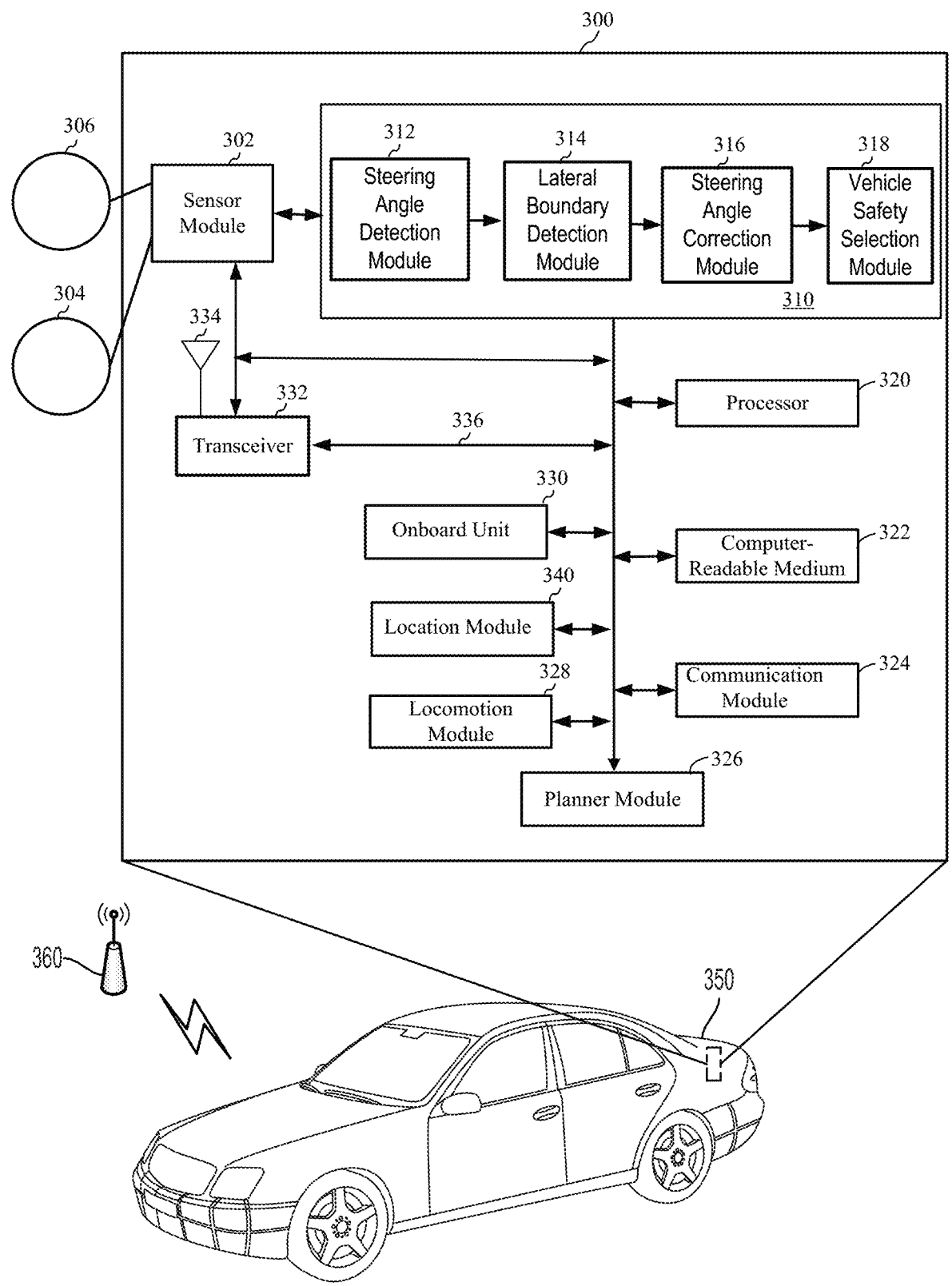
FIG. 3 is a diagram illustrating an example of a hardware implementation for a vehicle safety system, according to aspects of the present disclosure.

FIG. 3 is a diagram illustrating an example of a hardware implementation for a vehicle safety system 300, according to aspects of the present disclosure. The vehicle safety system 300 may be configured for improved driving safety of a car 350. The vehicle safety system 300 may be a component of a vehicle, a robotic device, or other non-autonomous device (e.g., non-autonomous vehicles). For example, as shown in FIG. 3, the vehicle safety system 300 is a component of a car 350.

Aspects of the present disclosure are not limited to the vehicle safety system 300 being a component of the car 350. Other devices, such as a bus, motorcycle, or other like non-autonomous vehicle, are also contemplated for implementing the vehicle safety system 300. In this example, the car 350 may be autonomous or semi-autonomous; however, other configurations for the car 350 are contemplated, such as an advanced driver assistance system (ADAS).

The vehicle safety system 300 may be implemented with an interconnected architecture, represented generally by an interconnect 336. The interconnect 336 may include any number of point-to-point interconnects, buses, and/or bridges depending on the specific application of the vehicle safety system 300 and the overall design constraints. The interconnect 336 links together various circuits including one or more processors and/or hardware modules, represented by a sensor module 302, a vehicle safety controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle safety system 300 includes a transceiver 332 coupled to the sensor module 302, the vehicle safety controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle safety controller 310 to/from connected vehicles within the vicinity of the car 350.

The vehicle safety system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle safety system 300 to perform the various functions described for vehicle safety of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle safety controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle safety system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle safety system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but is still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle safety controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle safety controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle safety controller 310 may receive sensor data directly from the first sensor 306 and the second sensor 304 to determine, for example, input traffic data images.

Traffic congestion on highways affects millions of people and presents an urgent problem to solve. In particular, vehicles may swerve in their lanes and temporarily enter adjacent lanes due to distracted drivers, which may generate traffic oscillations and extra congestion. Highways are potentially congested due to these distracted drivers and unexpected braking maneuvers of surrounding vehicles. Advanced driver assistance systems (ADAS) for vehicles are expected to reduce traffic accidents and improve traffic efficiency. In addition, automation of vehicle control on highways is rapidly advancing, which may eventually reduce traffic accidents and improve traffic efficiency.

Reducing traffic congestion may be achieved by effectively warning distracted drivers of vehicles traveling on highways. For example, a set of ADAS features installed in a non-autonomous vehicle (e.g., the car 350) may include a lane keeping assistance system and/or a lane departure warning system. Conventional lane keeping assistance systems do not provide visual and haptic information to the operator of a gap left inside a safety boundary. One difference between lane keeping assist and lane centering assistance is lane keep assistance operates in response to a safety boundary to activate the assistance, while lane centering assist may continual applying force relative to a center of a lane. Furthermore, conventional lane departure warning systems do not provide visual and haptic information to the operator of a steering angle to stay centered in a lane.

Aspects of the present disclosure are directed to the vehicle safety system 300 that displays a disparity of a recommended steering angle and a current steering angle for staying in a roadway lane. In some aspects of the present disclosure, the vehicle safety system 300 may apply torque, vibration, and/or haptic feedback to the steering wheel for the operator of the car 350. In response to the torque, vibration, and/or haptic feedback, the driver corrects the current steering angle relative to the recommended steering angle. In these aspects of the present disclosure, the vehicle safety system 300 displays an amount of correction recommended for safer driving by maintaining the car 350 at a recommended steering angle.

Aspects of the present disclosure are also directed to the vehicle safety system 300 configured to improve driving by keeping the car 350 between certain boundaries of a roadway lane using visualization. In some aspects of the present disclosure, the vehicle safety system 300 displays safety boundaries, ranges, and/or zones of recommended steering angles relative to the current steering angle. In these aspects of the present disclosure, the vehicle safety system 300 may use varying amounts of haptic feedback, which is provided laterally on the left and right sides of a steering wheel to guide the operator of the car 350. These varying amounts of lateral haptic feedback (e.g., to the left or right) help keep the car away from the lane boundaries. For example, the vehicle safety system 300 may use safety boundaries as the ranges, in which varying repelling forces are applied to the steering wheel to guide the operator of the car 350 in a lane for safer driving by remaining centered in a roadway lane.

As shown in FIG. 3, the vehicle safety controller 310 includes a steering angle detection module 312, a lateral boundary detection module 314, a steering angle correction module 316, and a vehicle safety selection module 318. The steering angle detection module 312, the lateral boundary detection module 314, the steering angle correction module 316, and the vehicle safety selection module 318 may be components of a same or different artificial neural network, such as a deep convolutional neural network (CNN). The vehicle safety controller 310 is not limited to a CNN. The vehicle safety controller 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The lateral boundary detection module 314 may be configured to detect lateral boundaries of a roadway to enable visualization of the lateral boundaries to a driver of the car 350. In these aspects of the present disclosure, the steering angle correction module 316 is configured to determine a steering angle of the car 350 to enable the driver to maintain the car 350 in the center of a roadway lane. The vehicle safety selection module 318 may visualize the roadway boundaries and/or the desired steering angle of the car 350 to avoid exiting the roadway lane into an adjacent lane.

The vehicle safety selection module 318 may display safety boundaries, ranges, and/or zones of recommended steering angles from the steering angle correction module 316 relative to the current steering angle. In these aspects of the present disclosure, the vehicle safety selection module 318 may apply varying amounts of haptic feedback, which is provided laterally on the left and right sides of a steering wheel to guide the operator of the car 350. These varying amounts of lateral haptic feedback (e.g., to the left or right) help keep the car away from the roadway lane boundaries. The vehicle safety selection module 318 may use varying amounts of haptic feedback, which is provided laterally on the left and right sides of a steering wheel to guide the operator of the car 350. The vehicle safety selection module 318 displays an amount of correction recommended to the driver for safer driving of the car 350 by maintaining the car 350 at a recommended steering angle, for example, as shown in FIG. 4.

Figure 4:
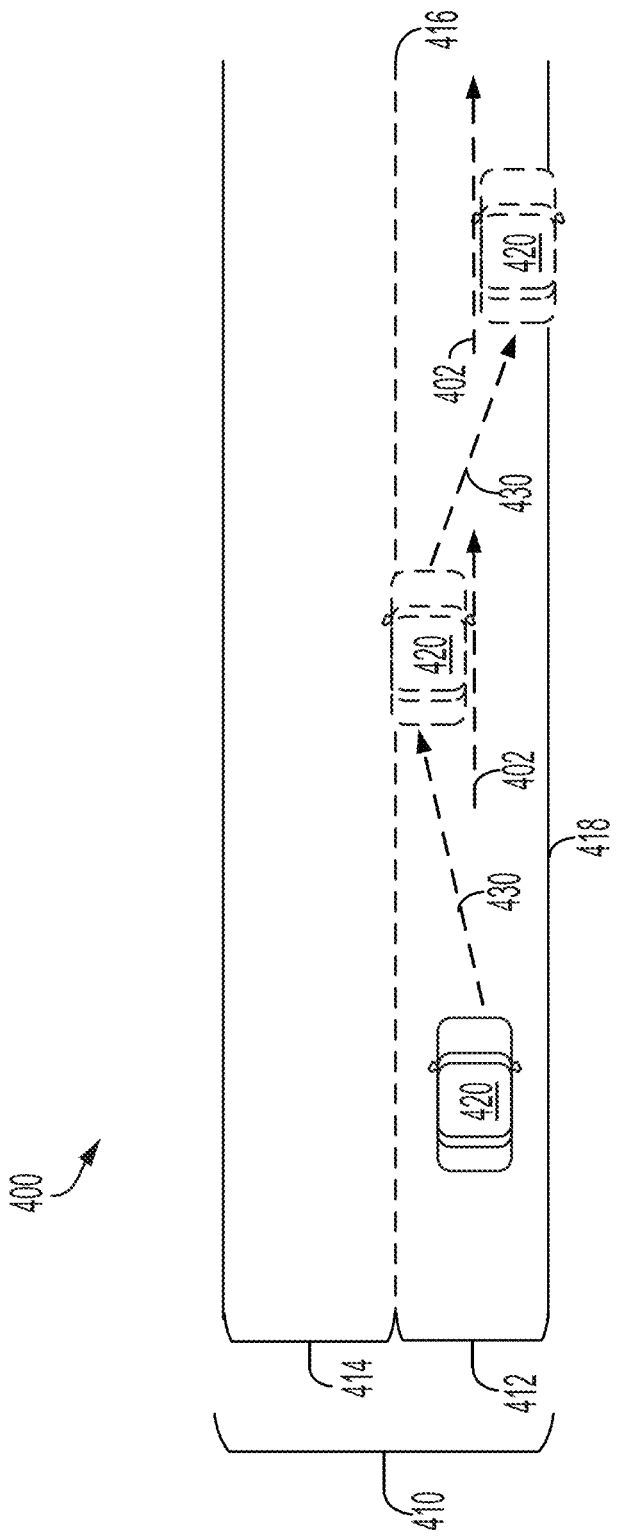
FIG. 4 is a diagram illustrating an overview of a roadway environment, including a swerving vehicle in a first lane of a roadway, according to aspects of the present disclosure.

FIG. 4 is a diagram illustrating an overview of a roadway environment, including a swerving vehicle in a first lane of a roadway, according to aspects of the present disclosure. In this example, a roadway environment 400 includes a roadway 410, having a first lane 412 in which a vehicle 420 is traveling and a second lane 414. In this example, the vehicle 420 is swerving in the first lane 412 as shown by a trajectory 430. In this example, the vehicle 420 is configured to monitor a portion of the vehicle relative to the boundaries of the first lane 412, as well as a center line of the first lane of the roadway 410. In this example, the vehicle 420, may be the car 350, shown in FIG. 3.

In one aspect of the present disclosure, safety of the vehicle 420 is controlled by a safety controller (e.g., the vehicle safety controller 310 of FIG. 3). In this example, the vehicle 420 (e.g., a vehicle perception module) identifies a dashed center line between the first lane 412 and the second lane 414 of the roadway 410 as a first lateral boundary 416 of the first lane 412. The vehicle 420 also identifies a right edge of the first lane 412 as a second lateral boundary 418 of the first lane 412 of the roadway 410. In addition, the vehicle 420 identifies a center 402 of the first lane 412.

According to aspects of the present disclosure, a vehicle safety system (e.g., the vehicle safety system 300) of the vehicle 420 is configured to provide varying amounts of lateral haptic feedback (e.g., on the left and right side) to a steering wheel of the vehicle 420 to guide the operator. In these aspects of the present disclosure describe, the vehicle safety system 300 displays a disparity between a recommended steering angle and a current steering angle for staying in a lane, such as the first lane 412. In particular, the vehicle safety system 300 may apply torque, vibration, or haptic feedback to the steering wheel for the operator to correct the steering angle relative to the recommended steering angle. The vehicle safety system 300 may provide force feedback in a zone proximate (e.g., within a predetermined range of) the recommended steering angle. As the operator approaches the zone, the vehicle safety system 300 may apply torque to the steering wheel, for example, as shown in FIGS. 5A-5C.

Figure 6A:
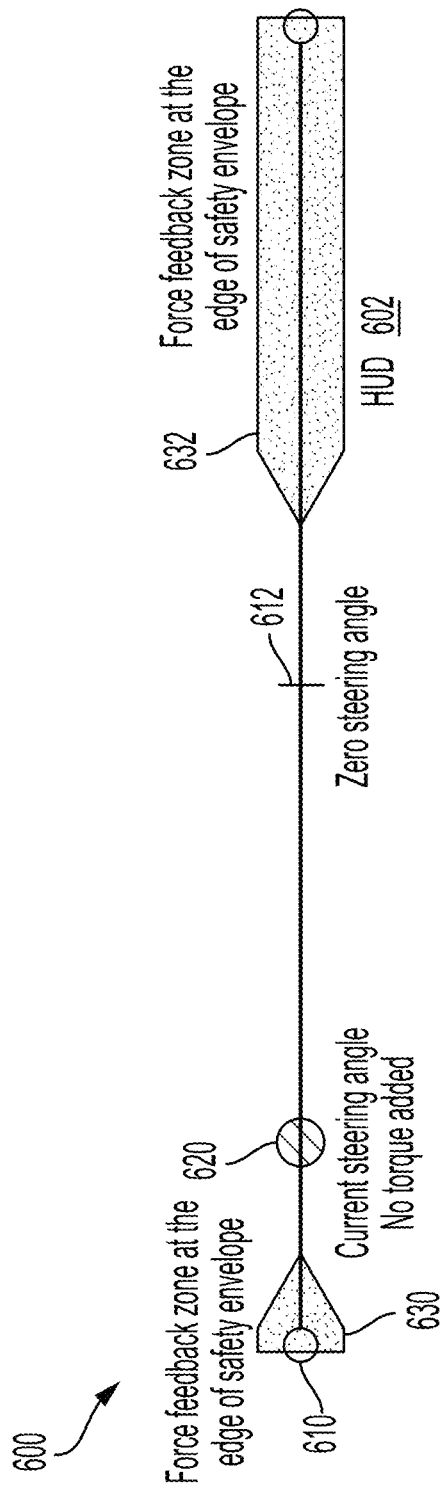
FIGS. 6A-6B illustrate visualizations of a safety envelope of a vehicle provided by a vehicle safety system, according to aspects of the present disclosure.
Figure 6B:
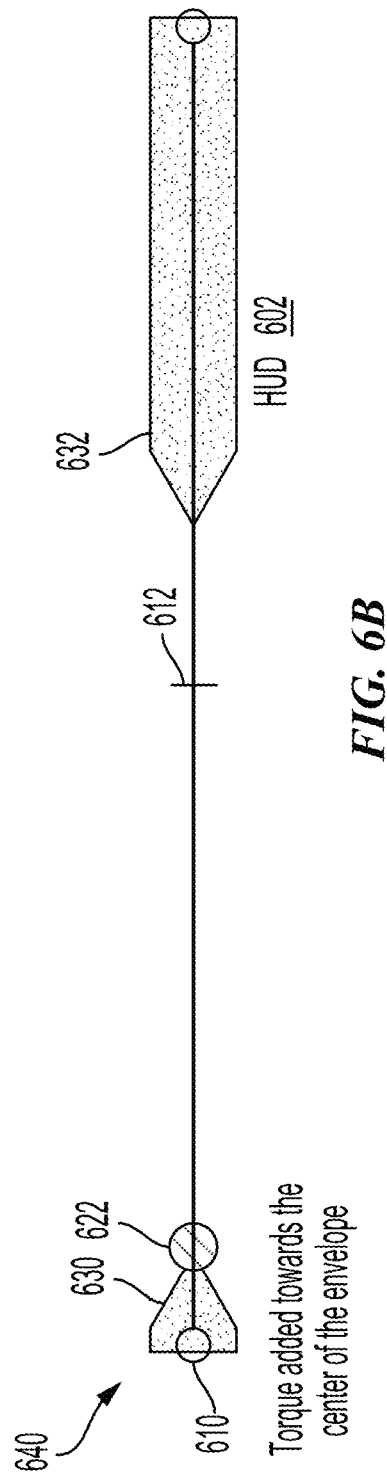

In other aspects of the present disclosure, the vehicle 420 is configured to provide varying amounts of haptic feedback laterally on the left and right side of a steering wheel of the vehicle 420 to guide the operator. These varying amounts of lateral haptic feedback (e.g., to the left or right of the steering wheel) help keep the vehicle 420 away from the first lateral boundary 416 and the second lateral boundary 418. For example, the vehicle safety system 300 may use safety boundaries as the ranges where varying repelling forces apply to guide an operator in a lane for safer driving by remaining in the center 402 of the first lane 412, for example, as shown in FIGS. 6A-6B.

Figure 5A:
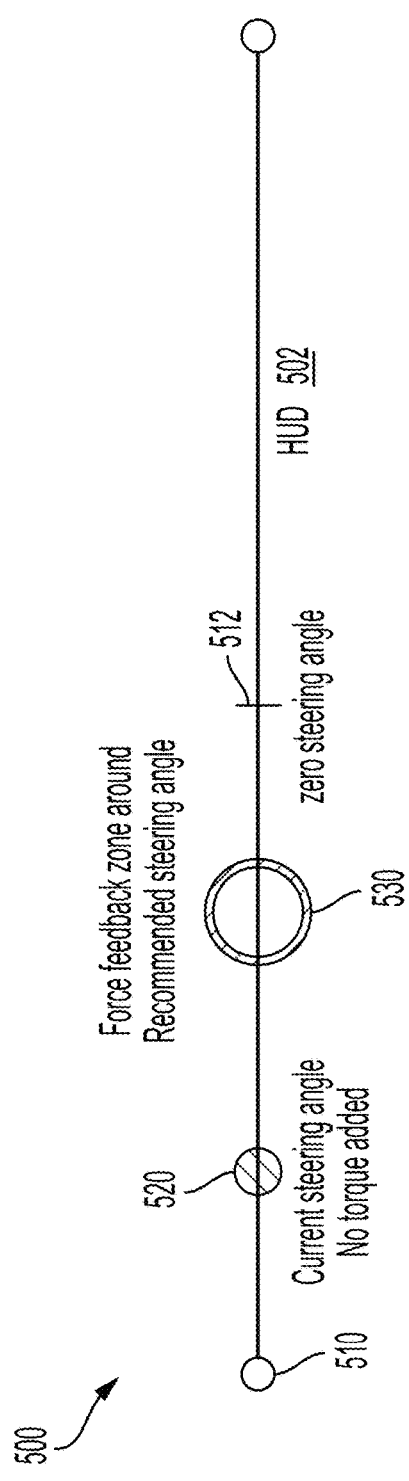
FIGS. 5A-5C illustrate visualizations of adjustments to reach a recommended steering angle of a vehicle provided by a vehicle safety system, according to aspects of the present disclosure.
Figure 5B:
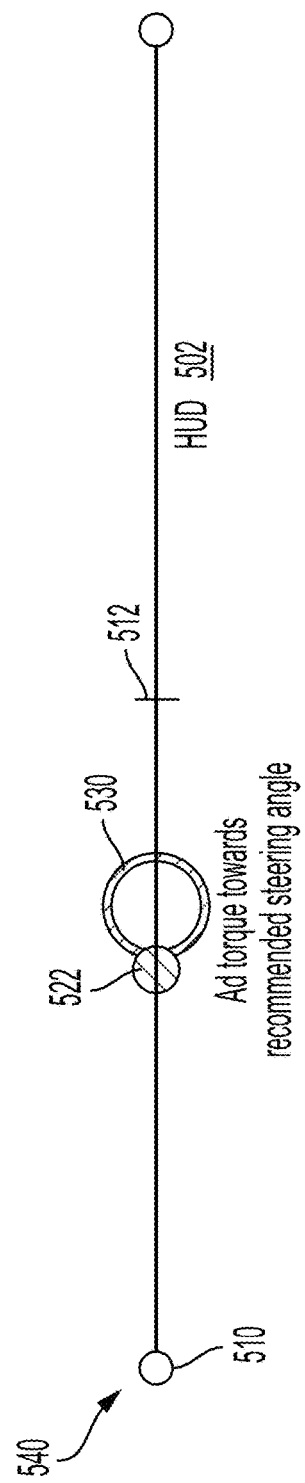
Figure 5C:
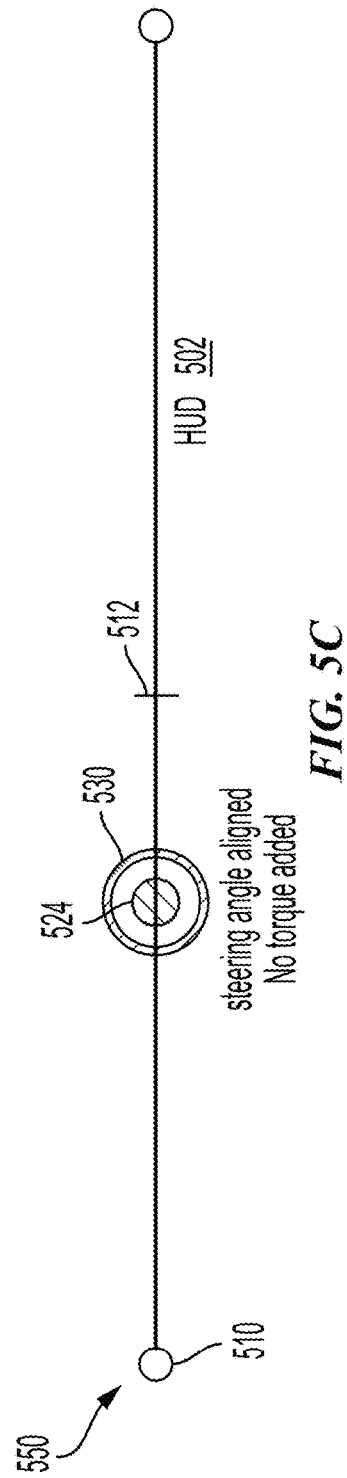

FIGS. 5A-5C illustrate visualizations of adjustments to reach a recommended steering angle of a vehicle provided by a vehicle safety system, according to aspects of the present disclosure. As shown in FIGS. 5A-5C, the vehicle safety system displays a recommended steering angle 530 and a zero steering angle 512 on a steering angle scale 510 on a vehicle display, such as a heads-up display (HUD) 502. In these examples, the heads-up display 502 illustrates the steering angle scale 510 for the operator to visualize the recommended steering angle 530 relative to a first current angle 520 at a first point in time 500, as shown in FIG. 5A.

As shown in FIG. 5B, the vehicle safety system may provide force feedback in a zone (e.g., circle) proximate the recommended steering angle 530 at a second point in time 540. For example, as the operator adjusts to a second current steering angle 522, which approaches the zone proximate the recommended steering angle 530, the vehicle safety system may apply torque to the steering wheel. In addition to the applied torque, the vehicle safety system displays a disparity between the recommended steering angle and the current steering angle (e.g., the second current steering angle 522) for staying in a lane.

As shown in FIG. 5C, the operator adjusts the current steering angle to achieve a third steering angle 524 within the zone of the recommended steering angle 530 at a third point in time 550. In this example, the operator of the vehicle is guided by torque, vibration, and/or haptic feedback applied by the vehicle safety system to correct the current steering angle relative to the recommended steering angle 530. As shown in FIG. 5C, once the third steering angle 524 is within the zone of the recommended steering angle 530, the vehicle safety system ceases application of the torque, vibration, and/or haptic feedback to the steering wheel. In this way, the vehicle safety system displays the amount of correction recommended for safer driving by remaining, for example, in the center 402 of the first lane 412, as shown in FIG. 4.

As shown in FIG. 5A-5C, the vehicle safety system displays a difference between the recommended steering angle 530 and a current steering angle, which represents a disparity from the current motion of the vehicle. In these aspects of the present disclosure, the vehicle safety system allows an operator to visualize absolute positions of the current and the recommended steering angles to improve lane centering. As such, the vehicle safety system communicates intentions if the vehicle recommends going a certain direction. For example, the vehicle safety system may provide the operator anticipation of haptic feedback by visualizing an assist range around the recommended steering angle 530, as shown by the circle proximate the recommended steering angle 530. When the current steering angle is in range, as shown in FIG. 5B, the vehicle safety system applies an attraction force or torque.

In aspects of the present disclosure, the vehicle safety system omits haptic feedback when the current angle is out of range, as shown in FIG. 5A. Nevertheless, the operator can still visually view the gap between the current and the recommended steering angle 530 using the heads-up display 502. Regarding details of the visualization of the heads-up display 502 shown in FIG. 5A-5C, the steering angle scale 510 may be linear, curved, circular, or other like configuration. In some aspects of the present disclosure, a tick interval and/or a range of the steering angle scale 510 is dynamically adjusted according to the speed of the vehicle. In some aspects of the present disclosure, the recommended steering angle 530 is represented using a single steering angle or a range of steering angles.

FIGS. 6A-6B illustrate visualizations of a safety envelope of a vehicle provided by a vehicle safety system, according to aspects of the present disclosure. As shown in FIGS. 6A-6B, the vehicle safety system displays a current steering angle and a zero steering angle 612 on a steering angle scale 610 of a heads-up display (HUD) 602. In these examples, the heads-up display 602 illustrates the steering angle scale 610 for the operator to visualize a safety boundary relative to a first current steering angle. As shown in FIG. 6A, a safety envelope is defined by a left edge 630 and a right edge 632. In the example shown in FIG. 6A, the first current steering angle 620 is within the safety envelope defined by the left edge 630 and the right edge 632 at a first point in time 600. As a result, the vehicle safety system omits application of torque to the steering wheel.

In FIG. 6B, the vehicle safety system displays a second current steering angle 622 on the heads-up display 602 and the steering angle scale 610 for the vehicle operator to visualize the second current steering angle 622 relative to the safety envelope. In this example, the vehicle safety system applies force feedback on the steering wheel to notify the vehicle operator of a current proximity between the second current steering angle 622 and the left edge 630 of the safety envelope at a second point in time 640. As the vehicle operator approaches the left edge 630 of the safety envelope, the vehicle safety system may also apply torque to the steering wheel for correction away from the left edge 630 of the safety envelope.

According to aspects of the present disclosure, the vehicle safety system may adapt the safety envelope laterally by different amounts on the left edge 630 and the right edge 632 according to various driving events. For example, these driving events may include a vehicle cutting-in from another lane to provide the operator with improved safety and guidance. Regarding details of the visualization of the heads-up display 602 shown in FIGS. 6A-6B, the steering angle scale 610 may be linear, curved, circular, or other like configuration. In some aspects of the present disclosure, a tick interval and/or a range of the steering angle scale 610 is dynamically adjusted according to the speed of the vehicle. In some aspects of the present disclosure, the recommended steering angle 530 (of FIGS. 5A-5C) is represented using a single steering angle or a range of steering angles.

According to aspects of the present disclosure, the recommended steering angle 530 (of FIGS. 5A-5C) is not always a center of a roadway lane. For example, when driving by a parked car, the recommended steering angle 530 is biased to provide enough margin for avoiding the parked car. In addition, the left edge 630 and the left edge 630 of the safety envelope of FIGS. 6A and 6B are not limited to a lane boundary. For example, when a cut-in vehicle is detected, the safety envelope on the cut-in side can shrink. In other aspects of the present disclosure, the safety envelope may be a road boundary instead of lane boundaries where there are no lane markings.

Aspects of the present disclosure are directed to a vehicle safety system that displays a disparity of a recommended steering angle and a current steering angle for staying in a roadway lane. In some aspects of the present disclosure, the vehicle safety system may apply torque, vibration, and/or haptic feedback to the steering wheel for the operator. In response to the torque, vibration, and/or haptic feedback, a driver corrects the current steering angle relative to the recommended steering angle. In these aspects of the present disclosure, the vehicle safety system displays an amount of correction recommended for safer driving by maintaining a vehicle at a recommended steering angle.

Aspects of the present disclosure are also directed to a vehicle safety system that improves driving by keeping a vehicle between certain boundaries of a roadway lane using visualization. In some aspects of the present disclosure, the vehicle safety system displays safety boundaries, ranges, and/or zones of steering angles recommended. The vehicle safety system also displays the current steering angle. In these aspects of the present disclosure, the vehicle safety system may use varying amounts of haptic feedback laterally on the left and right to guide the operator. These varying amounts of haptic feedback laterally (e.g., to the left or right) help keep the vehicle away from the boundaries. For example, the vehicle safety system may use safety boundaries as the ranges where varying repelling forces apply to guide an operator in a lane for safer driving by remaining centered in a roadway lane. A method for visualizing a current steering angle and providing feedback to safely guide a vehicle operator on a roadway is shown in FIG. 7.

FIG. 7 is a flowchart illustrating a method of visualizing a current steering angle and providing feedback to safely guide a vehicle operator on a roadway, according to aspects of the present disclosure. A method 700 begins at block 702, in which a current steering angle at which a vehicle is traveling is determined. At block 704, the current steering angle is displayed relative to a steering angle scale. For example, a heads-up display 502 illustrates a steering angle scale 510 for an operator to visualize a recommended steering angle 530 relative to a first current angle 520 at a first point in time 500, as shown in FIG. 5A.

At block 706, an operator of the vehicle is guided through feedback provided through a steering wheel of the vehicle while displaying the current steering angle relative to the steering angle scale. For example, as shown in FIG. 5B, the vehicle safety system may provide force feedback in a zone (e.g., circle) proximate the recommended steering angle 530 at a second point in time 540. In this example, as the operator adjusts to a second current steering angle 522, which approaches the zone proximate the recommended steering angle 530, the vehicle safety system may apply torque to the steering wheel. As shown in FIG. 5C, the operator adjusts the current steering angle to achieve a third steering angle 524 within the zone of the recommended steering angle 530 at a third point in time 550. The operator of the vehicle is guided by torque, vibration, and/or haptic feedback to correct the current steering angle relative to the recommended steering angle 530. Once the third steering angle 524 is within the zone of the recommended steering angle 530, the vehicle safety system ceases application of the torque, vibration, and/or haptic feedback to the steering wheel.

In some aspects of the present disclosure, the method shown in FIG. 7 may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102) and/or other components included therein of the vehicle 150, or the vehicle safety system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium.

For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for a vehicle safety, the method comprising:
   determining a current steering angle at which a vehicle is traveling;
   displaying the current steering angle relative to a steering angle scale;
   determining a recommended steering angle of the vehicle;
   displaying the recommended steering angle relative to the current steering angle of the vehicle;
   issuing a visual warning if the current steering angle is outside the recommended steering angle of the vehicle;
   monitoring a driver adjustment of the current steering angle of the vehicle toward the recommended steering angle until the driver adjustment of the current steering angle of the vehicle is within a predetermined range of the recommended steering angle; and then
   applying haptic feedback through a steering wheel of the vehicle until the current steering angle of the vehicle is aligned with the recommended steering angle, while displaying the current steering angle relative to the recommended steering angle scale.

2. The method of claim 1, further comprising applying torque to the steering wheel as the current steering angle is within the predetermined range of the recommended steering angle.

3. The method of claim 1, in which displaying the current steering angle comprises:
   determining a left edge of a safety envelope;
   determining a right edge of the safety envelope; and
   displaying the left edge and the right edge of the safety envelope relative to the current steering angle of the vehicle.

4. The method of claim 1, in which guiding comprises:
   determining a left edge of a safety envelope;
   determining a right edge of the safety envelope; and
   providing haptic feedback to the operator of the vehicle when the current steering angle is within a predetermined range of the left edge or the right edge of the safety envelope.

5. The method of claim 4, further comprising applying torque to the steering wheel as the current steering angle is within the predetermined range of the left edge or the right edge of the safety envelope.

6. The method of claim 1, in which displaying the current steering angle comprises dynamically adjusting the steering angle scale according to a speed of the vehicle.

7. A non-transitory computer-readable medium having program code recorded thereon for vehicle safety, the program code being executed by a processor and comprising:
   program code to determine a current steering angle at which a vehicle is traveling;
   program code to display the current steering angle relative to a steering angle scale;
   program code to determine a recommended steering angle of the vehicle;
   program code to display the recommended steering angle relative to the current steering angle of the vehicle;
   program code to issue a visual warning if the current steering angle is outside the recommended steering angle of the vehicle;
   program code to monitor a driver adjustment of the current steering angle of the vehicle toward the recommended steering angle until the driver adjustment of the current steering angle of the vehicle is within a predetermined range of the recommended steering angle; and then
   program code to apply haptic feedback through a steering wheel of the vehicle until the current steering angle of the vehicle is aligned with the recommended steering angle, while displaying the current steering angle relative to the recommended steering angle scale.

8. The non-transitory computer-readable medium of claim 7, further comprising program code to apply torque to the steering wheel as the current steering angle is within the predetermined range of the recommended steering angle.

9. The non-transitory computer-readable medium of claim 7, the program code to display the current steering angle comprises:
   program code to determine a left edge of a safety envelope;
   program code to determine a right edge of the safety envelope; and
   program code to display the left edge and the right edge of the safety envelope relative to the current steering angle of the vehicle.

10. The non-transitory computer-readable medium of claim 7, in which the program code to guide comprises:
   program code to determine a left edge of a safety envelope;
   program code to determine a right edge of the safety envelope; and
   program code to provide haptic feedback to the operator of the vehicle when the current steering angle is within a predetermined range of the left edge or the right edge of the safety envelope.

11. The non-transitory computer-readable medium of claim 10, further comprising program code to apply torque to the steering wheel as the current steering angle is within the predetermined range of the left edge or the right edge of the safety envelope.

12. The non-transitory computer-readable medium of claim 7, the program code to display the current steering angle comprises program code to dynamically adjust the steering angle scale according to a speed of the vehicle.

13. A system for vehicle safety, the system comprising:
   a steering angle detection module to determine a current steering angle at which a vehicle is traveling;
   a vehicle display to display the current steering angle relative to a steering angle scale;
   a lateral boundary detection module to determine a recommended steering angle of the vehicle displayed relative to the current steering angle of the vehicle through the vehicle display, to issue a visual warning if the current steering angle is outside the recommended steering angle of the vehicle and to monitor a driver adjustment of the current steering angle of the vehicle toward the recommended steering angle until the driver adjustment of the current steering angle of the vehicle is within a predetermined range of the recommended steering angle; and then
   a steering angle correction module to apply haptic feedback through a steering wheel of the vehicle until the current steering angle of the vehicle is aligned with the recommended steering angle, while displaying the current steering angle relative to the recommended steering angle scale.

14. The system of claim 13, further comprising a vehicle safety selection module to apply torque to the steering wheel as the current steering angle is within the predetermined range of the recommended steering angle.

15. The system of claim 13, further comprising a vehicle safety selection module to provide haptic feedback to the operator of the vehicle when the current steering angle is within a predetermined range of a left edge or a right edge of a safety envelope.

* * * * *